(12) United States Patent
Schedivy et al.

(10) Patent No.: US 7,548,413 B2
(45) Date of Patent: Jun. 16, 2009

(54) COVER FOR A VEHICLE MEDIA DEVICE

(75) Inventors: George C. Schedivy, Aquebogue, NY (US); Jeff Macholz, Patchogue, NY (US)

(73) Assignee: Audiovox Corporation, Hauppauge, NY (US)

( * ) Notice: Subject to any disclaimer, the term of this patent is extended or adjusted under 35 U.S.C. 154(b) by 282 days.

(21) Appl. No.: 11/229,215

(22) Filed: Sep. 16, 2005

(65) Prior Publication Data

US 2007/0070259 A1    Mar. 29, 2007

(51) Int. Cl.
*G06F 1/16*    (2006.01)
(52) U.S. Cl. .............................. 361/679.02; 361/679.27; 206/320
(58) Field of Classification Search ......... 361/679–683; 312/223.1; 206/320; D14/184, 250; 150/154, 150/158, 161, 165; 224/275, 433, 435, 539, 224/553, 563, 564, 929
See application file for complete search history.

(56) References Cited

U.S. PATENT DOCUMENTS

| | | | | | |
|---|---|---|---|---|---|
| 5,128,829 | A | * | 7/1992 | Loew | 361/683 |
| 5,214,574 | A | * | 5/1993 | Chang | 361/680 |
| 5,551,497 | A | * | 9/1996 | Stanley | 150/154 |
| 5,835,344 | A | * | 11/1998 | Alexander | 361/683 |
| 5,986,634 | A | * | 11/1999 | Alioshin et al. | 345/649 |
| 6,109,434 | A | * | 8/2000 | Howard, Jr. | 206/320 |
| 6,149,116 | A | * | 11/2000 | Won | 248/309.4 |
| 6,347,796 | B1 | * | 2/2002 | Grossman et al. | 273/148 B |
| 6,491,194 | B2 | | 12/2002 | Marvin | 224/483 |
| 6,520,607 | B2 | | 2/2003 | Pfaff | 312/204 |
| 6,536,589 | B2 | * | 3/2003 | Chang | 206/320 |
| 6,561,702 | B1 | | 5/2003 | Yik | 396/420 |
| 6,882,524 | B2 | | 4/2005 | Ulla et al. | 361/680 |
| D518,293 | S | * | 4/2006 | Lam | D3/273 |
| D521,524 | S | * | 5/2006 | Chang | D14/496 |
| 7,180,735 | B2 | * | 2/2007 | Thomas et al. | 361/686 |
| 2002/0159270 | A1 | | 10/2002 | Lynam et al. | |
| 2004/0175155 | A1 | * | 9/2004 | Liu | 386/125 |
| 2005/0021190 | A1 | | 1/2005 | Worrell et al. | |
| 2005/0185916 | A1 | * | 8/2005 | Jost et al. | 386/46 |
| 2006/0061008 | A1 | | 3/2006 | Karner et al. | |
| 2006/0097537 | A1 | * | 5/2006 | Schedivy | 296/37.8 |
| 2006/0125295 | A1 | * | 6/2006 | Schedivy | 297/188.01 |
| 2006/0161713 | A1 | * | 7/2006 | Belady | 710/303 |
| 2007/0171316 | A1 | * | 7/2007 | Mathias et al. | 348/837 |

OTHER PUBLICATIONS

International Search Report dated Aug. 4, 2008 in corresponding International Appln. No. PCT/US08/58269.

* cited by examiner

*Primary Examiner*—Jayprakash N Gandhi
*Assistant Examiner*—Anthony Q Edwards
(74) *Attorney, Agent, or Firm*—F. Chau & Associates, LLC

(57) ABSTRACT

A cover for a vehicle media device, wherein the media device comprises a console and a display attached to the console, comprises a first part having a first opening for receiving the console, and a second part coupled to the first part and covering a side of the display. The first part is coupled to the console using a snap-on mechanism or an adhesive.

30 Claims, 6 Drawing Sheets

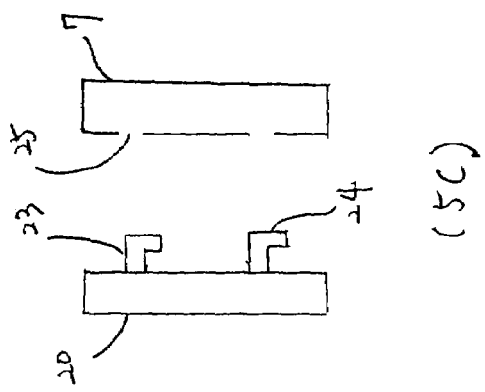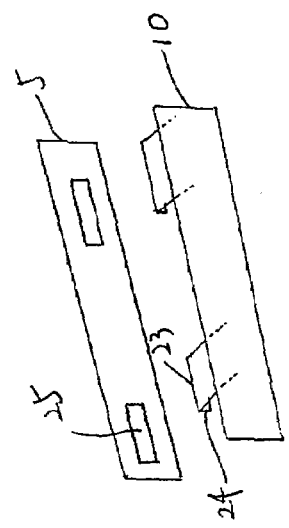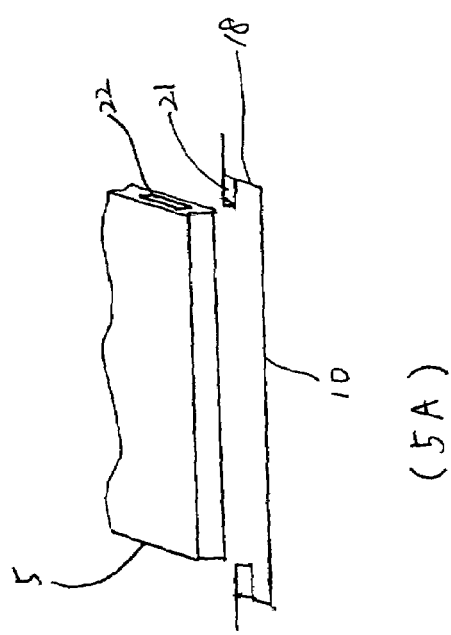
Fig. 5

COVER FOR A VEHICLE MEDIA DEVICE

BACKGROUND OF THE INVENTION

1. Technical Field

The present disclosure relates to a cover for a vehicle media device, and more particularly to a cover that can be easily attached to the media device and enables a user to control the appearance of the media device.

2. Discussion of Related Art

Media devices for a vehicle, such as an overhead display and a headrest display, are popular because passengers can enjoy audio and video entertainment on the road. Conventionally, the colors of the overhead displays or the headrest displays are limited to a few choices due to the high cost of manufacturing multiple media devices having a variety of colors. Due to limited colors available for the media devices, consumers have limited choices. As a result, the media devices do not blend with an existing décor of the vehicle.

Therefore, there is a need for a device to meet consumers' demands for media devices having various colors without increasing manufacturing costs.

SUMMARY OF THE INVENTION

According to embodiments of the present invention, a cover for a vehicle media device is available in a variety of colors to permit blending with the decor of the vehicle. The cover enables dealers to stock a single style media device, and multiple covers having different colors to allow consumers to choose a cover having a color that blends with the vehicle interior.

According to an embodiment of the present invention, a cover for a vehicle media device, wherein the media device comprises a console and a display attached to the console, comprises a first part having a first opening for receiving the console, and a second part coupled to the first part and covering a side of the display.

The first part may be coupled to the console using a snap-on mechanism. The first part may be coupled to the console using an adhesive. The second part may be coupled to the first part using a hinge. The second part may be coupled to the display. The second part may be coupled to the display using a snap-on mechanism. The second part may be coupled to the display using an adhesive. The adhesive may include two-sided tape, glue and rubber cement.

The display may pivot with respect to the console and the second part may pivot with the display. The first part may include a second opening for receiving a data source. The first part may include a second opening aligned with a port or jack in the console. The data source may comprise at least one of a compact disc, a digital video disk, a video cassette, a hard drive, a flash memory device, memory card or a mass storage device. The media device may be positioned overhead in the vehicle. The media device may be positioned in a vehicle seat.

According to an embodiment of the present invention, a removable cover for a vehicle media device, wherein the media device comprises a console, a display, pivotally attached to the console, comprises a first part substantially enclosing the console therein, and a second part substantially covering at least a side of the display.

According to an embodiment of the present invention, a cover for a media device mounted in a vehicle comprises a trim part for substantially enclosing an exposed perimeter of the media device, and a surface part for substantially covering a remaining exposed surface of the media device. The cover is preferably integrally molded as a single piece from a resilient plastic material. Alternatively, the cover can be made from multiple pieces joined together, or of other materials than resilient plastic.

According to an embodiment of the present invention, a method for stocking an inventory of media device for installation in a vehicle comprises stocking a single type of media devices for installation in the vehicle, and stocking a plurality of types of covers for the single type of media device.

According to an embodiment of the present invention, a cover for a vehicle media device, wherein the media device comprises a console and a display attached to the console, comprises a first part having a first opening for receiving the display, and a second part coupled to the first part covering the display.

BRIEF DESCRIPTION OF DRAWINGS

Exemplary embodiments of the present invention can be understood in more detail from the following descriptions taken in conjunction with the accompanying drawings, of which:

FIGS. 5A-5C show mechanisms for attaching a cover to media device according to embodiments of the present invention.

DETAILED DESCRIPTION OF PREFERRED EMBODIMENTS

Preferred embodiments of the present invention will now be described more fully hereinafter below in more detail with reference to the accompanying drawings. This invention may, however, be embodied in different forms and should not be construed as limited to the embodiments set forth herein.

Figure 1:
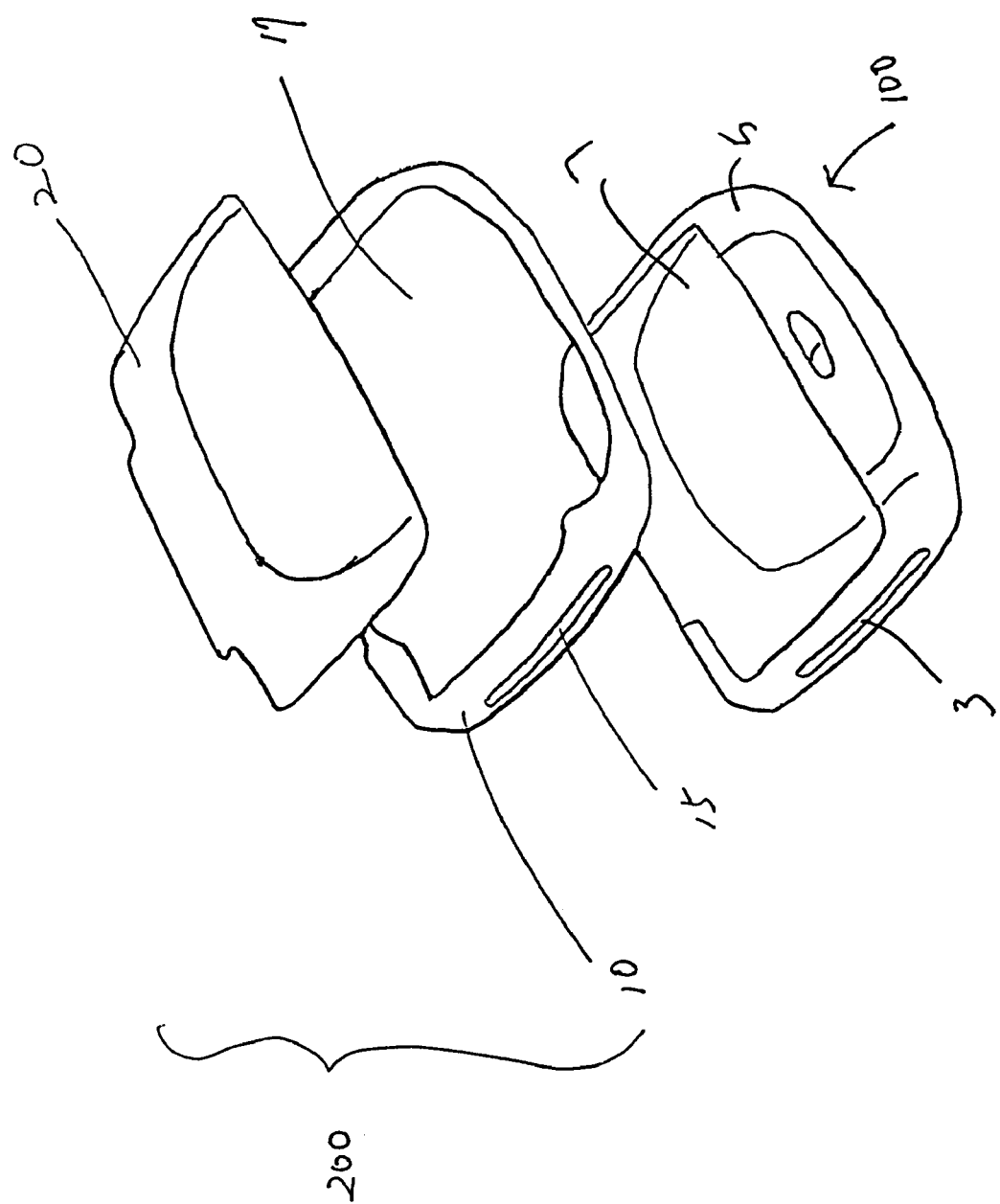
FIG. 1 is an exploded perspective view of a cover for an overhead media device according to an embodiment of the present invention.
Figure 4:
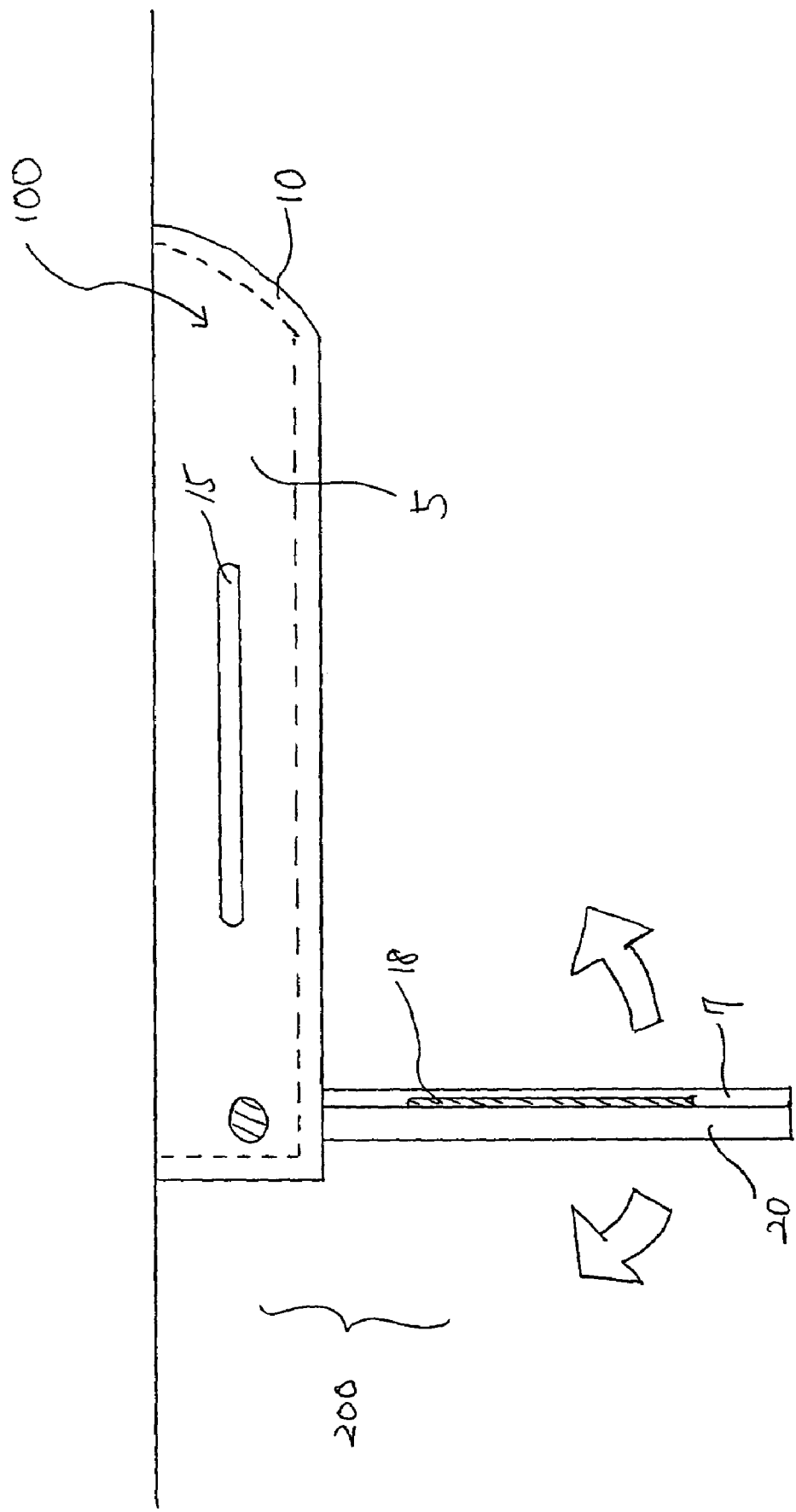
FIG. 4 shows a side view of a cover for an overhead media device according to an embodiment of the present invention.

FIG. 1 shows a cover 200 for a media device 100 for a vehicle according to an embodiment of the present invention. Referring to FIG. 1, the media device 100 comprises a console 5 and a display 7 attached to the console 5. The media device 100 may further comprise a hinge (not shown) connecting the display 7 to the console 5. The media device 100 can be positioned overhead in the vehicle as shown in FIG. 4.

The console 5 includes, for example, one or more media players such as a compact disc (CD) player, a digital video disk (DVD) player, a video cassette player (VCP), a processing unit for reading a flash memory device, a hard drive or mass storage device, and/or a memory card reader. The media players in the console 5 receive data from data sources such as a compact disc, a digital video disk, a video cassette, a hard drive, a flash memory device, memory card or a mass storage device for displaying the data, such as, for example, a video program/movie, on the display 7. An opening 3 can be used to receive the data sources. The display 7 can be constructed using any of one or more known display technologies, such as, for example, liquid crystal display (LCD) technology.

The cover 200 for enclosing the media device 100 comprises a trim part 10 and a surface part 20. The trim part 10 substantially encloses an exposed perimeter of the media device 100. The trim part 10 has a first opening 17 for receiving the console 5. The trim part 10 has dimensions approximately equal to the size of the console 5 so that the console 5 fits into the trim part 10. The trim part 10 further includes a second opening 15 for receiving data source(s). The second opening 15 of the trim part 10 is aligned with an opening 3 in the console 5. The second opening 15 of the trim part 10 may be aligned with a port or jack (not shown) in the console 5 such as, for example, a USB port or an audio/video or headphone jack. The surface part 20 is coupled to the trim part 10 and substantially covers a remaining exposed surface of the media device 100. For example, the surface part 20 covers a back surface of the display 7.

Figure 2:
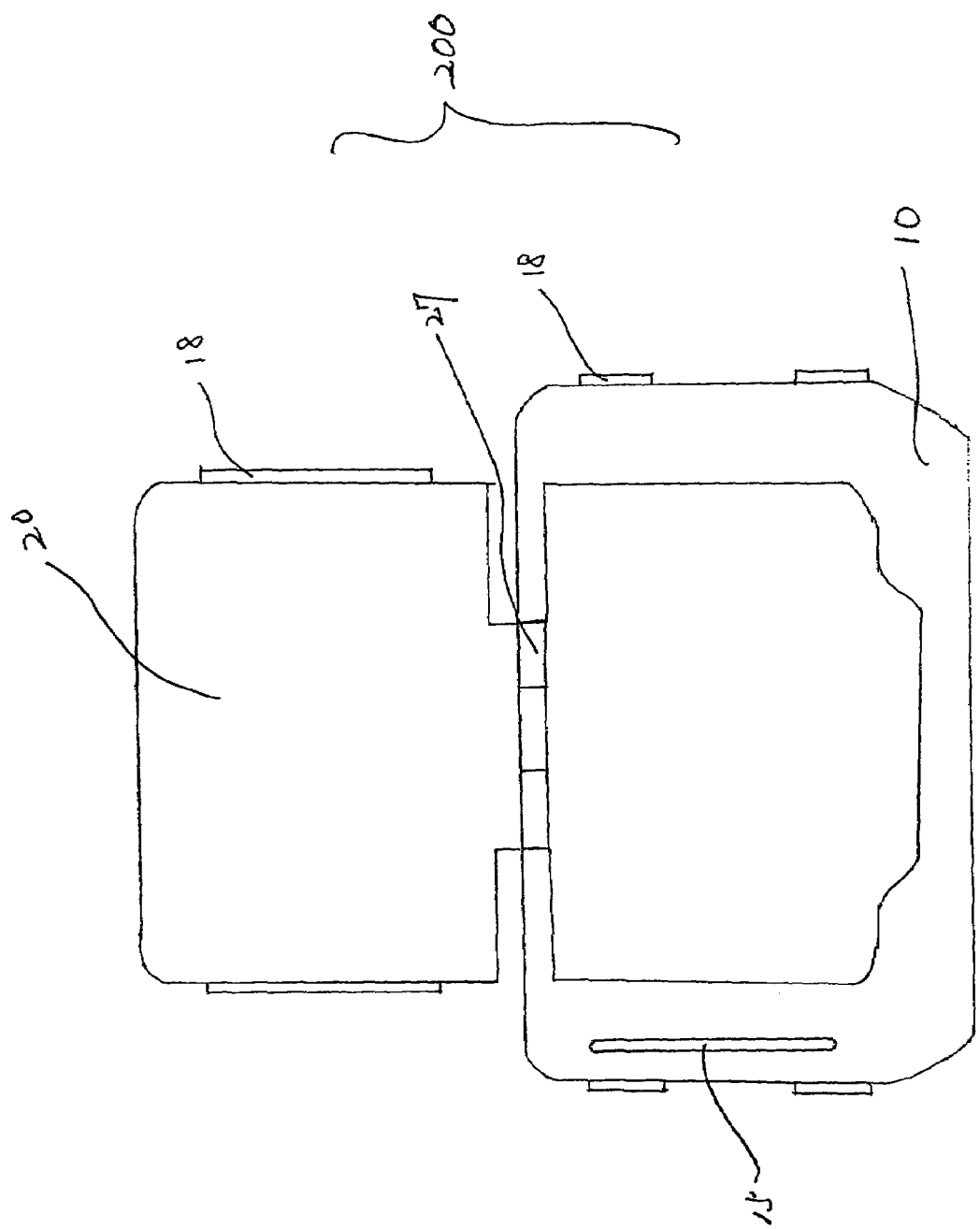
FIG. 2 is a plan view of a cover for an overhead media device according to an embodiment of the present invention.

Referring to FIGS. 1 and 2, the cover 200, according to an embodiment of the present invention, can be readily attached to and removed from the media device 100 without tools. Alternatively, the cover 200 may be permanently attached to the media device 100. The cover 200 utilizes any one or combination of a variety of retention features that provide stability while permitting easy attachment. In particular, the trim part 10 can be coupled to the console 5 and the surface part 20 can be coupled to the display 7 using, for example, a snap-on mechanism.

In an embodiment of the invention, the sides of the trim part 10 and/or surface part 20 can be flexed outward to wrap around the sides of the console 5 and/or display 7. Once the trim and surface parts 10, 20 are in position, the sides of the trim part and surface parts 10, 20 flex inward to engage and hold to the sides of the console 5 or display 7. Accordingly, the trim and surface parts 10, 20 may comprise a flexible material such as plastic.

In another embodiment of the present invention, flexible clip portions 18 are formed along peripheral regions of the trim part 10 and the surface part 20. The flexible clip portions 18 flex outward to wrap around the sides of the console 5 or the display 7. Once the trim part 10 or the surface part 20 is in position, the flexible clip portions 18 flex inward to engage the sides of the console 5 or display 7 to form a friction fit to sides of the console 5 and/or to the display 7. As shown in FIGS. 2 and 4, the flexible clip portions 18 can be a long continuous portion or multiple shorter portions.

Referring to FIG. 5A, in another embodiment, the flexible clip portion 18 can include a protrusion 21 that snaps into a recessed portion 22 on the console or the display 7.

Referring to FIGS. 5B and 5C, the console 5 and the display 7 may include a protrusion(s) 23 having an angled end 24 which fits into a recessed portion(s) 25 to hook the trim part 10 and/or the surface part 20 to the console 5 and/or the display 7.

Thus, the trim part 10 and the surface part 20 can be attached to and removed from the console 5 and the display 7, easily and repetitively without damage for users changing the cover 200. Alternatively, the trim part 10 and the surface part 20 can be permanently coupled to the console 5 and the display 7, respectively by using, for example, fixing devices such as adhesives, screws, or bolts.

The surface part 20 can be coupled to the trim part 10 using a hinge 27. The hinge 27 is preferably fixed to the trim part 10 using conventional methods, such as screws, molding, adhesives or the like. The hinge 27 may be any hinge sufficient to allow movement along one or multiple axes, (e.g., x, y, z or any combination thereof). Accordingly, the surface part 20 pivots with respect to the trim part 10 and, in turn, with respect to the console in tandem with the display 7.

In an embodiment of the present invention, the surface part 20 and the trim part 10 may comprise two separate units respectively coupled to the display 7 and the console 5. Alternatively, the surface part 20 and the trim part 10 may be joined as a single unit which is folded at the hinge 27.

Figure 3:
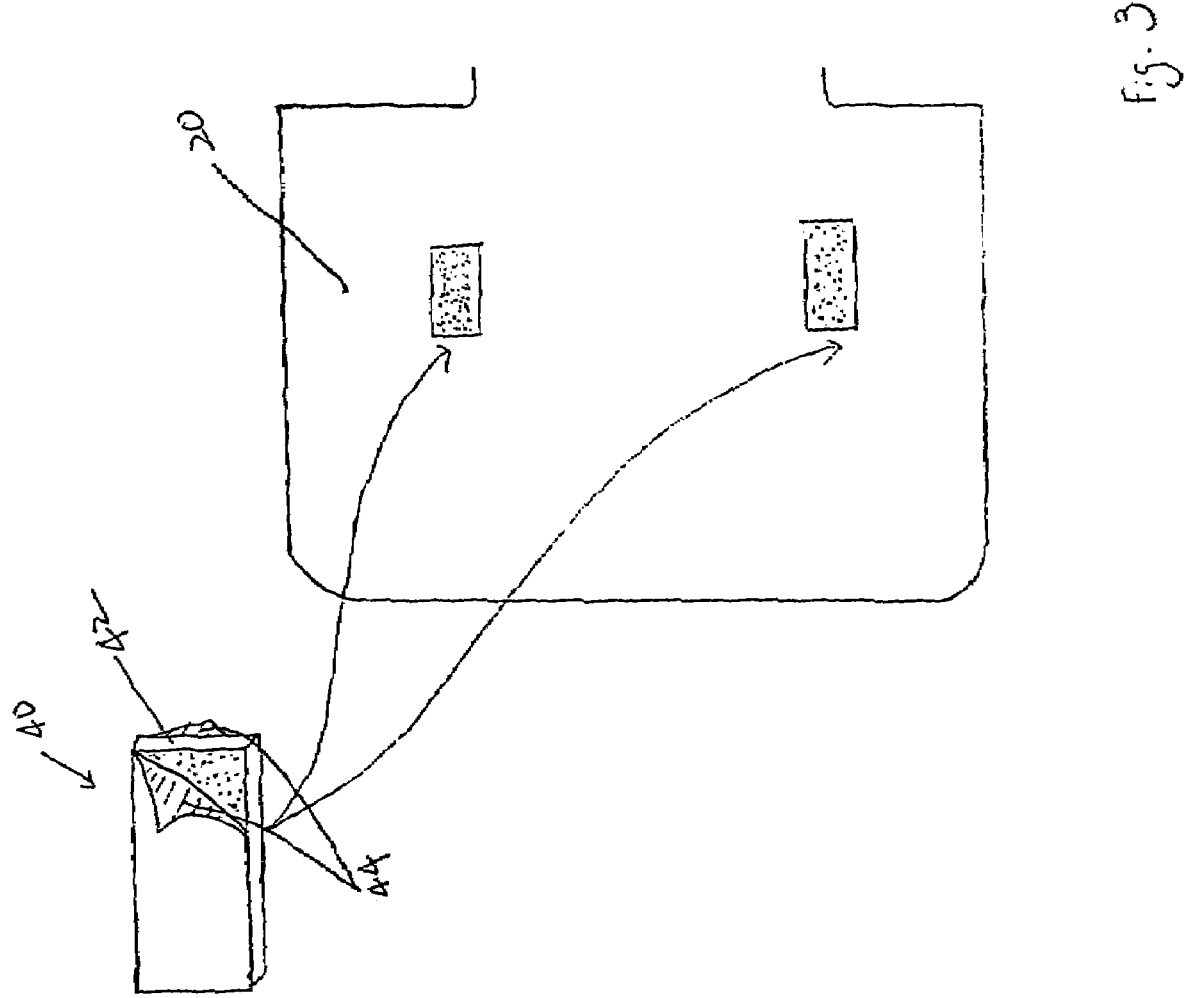
FIG. 3 shows a mechanism for attaching a cover to a media device according to an embodiment of the present invention.

The surface part 20 can be coupled to the display 7 using the mechanisms described in connection with FIGS. 2, 4 and 5A-5C above. Alternatively, the surface part 20 is coupled to the display 7 using an adhesive. The adhesive includes, for example, a two-sided tape, glue and rubber cement. Referring to FIG. 3, two-sided tape 40 includes an adhesive strip 42 and release sheets 44. The release sheets 44 are removed from the adhesive strip 42 to expose an adhesive coated surface thereunder. By applying the adhesive strip 42 to a surface of either the surface part 20 or the display 7, the surface part to the display 7 can be secured. Two-sided tape 40 may also be used to couple the trim part 10 to the console 5.

FIG. 4 shows the cover 200 and the media device 100 combined according to an embodiment of the present invention. Referring to FIG. 4, the trim part 10 encloses the console 5 positioned overhead in the vehicle. The surface part 20 is attached to the back of the display 7 with the snap-on mechanism using, for example, the flexible clip portions 18. The display 7 pivots with respect to the console 5 and the surface part 20 pivots with the display 7.

Figure 6:
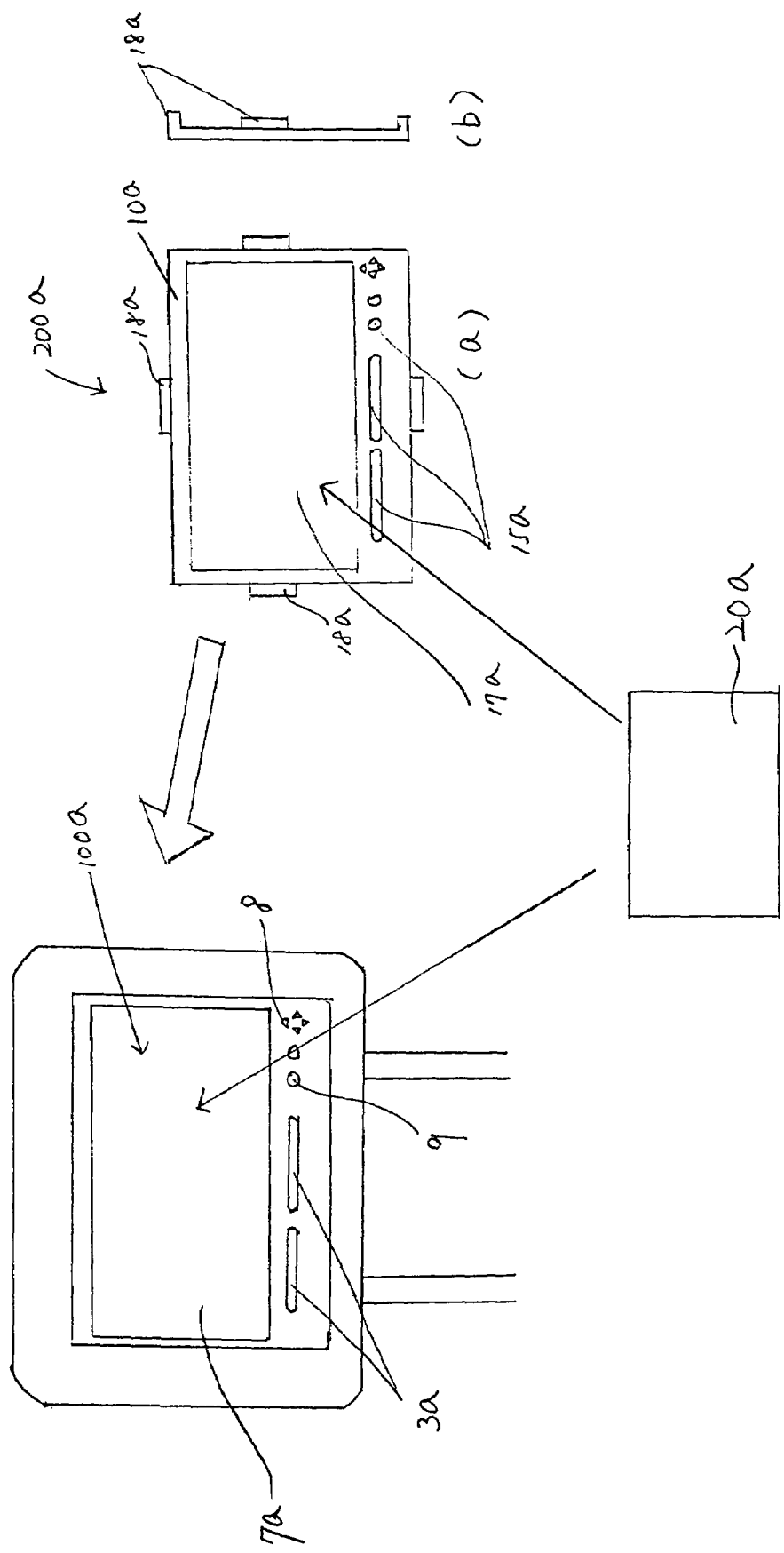
FIG. 6 shows a cover for a headrest media device according to an embodiment of the present invention.

Referring to FIG. 6, a cover 200a for enclosing a media device 100a positioned in a headrest is shown. In another embodiment, the media device 100a can be positioned in a backrest of a vehicle seat. FIG. 6(a) is a front view and FIG. 6(b) is a side view of the cover 200a.

The cover 200a for the media device 100a comprises a trim part 10a. The trim part 10a substantially encloses an exposed perimeter of the media device 100a. The trim part 10a includes a first opening 17a for exposing the display screen 7a. The first opening 17a may comprise a window comprising a transparent material through which video can be viewed. The trim part 10a further includes a second opening(s) 15a aligned with an opening 3a, ports or jacks 9 and/or control buttons 8 in the console 5a.

In addition to the trim part 10a, the cover 100a may comprise a display part 20a for covering a display screen when not in use. The display part 20a may be joined to the trim part 10a using a hinge or attach to the trim part 10a using, for example, a snap-on mechanism similar to those described above.

Similar to the cover 200, the cover 200a can be readily attached to and removed from the media device 100a without tools. Alternatively, the cover 200a may be permanently attached to the media device 100a. Similar to the cover 200, the cover 200a may use a variety of retention features such as a snap-on mechanism. For example, flexible clip portions 18a formed on the trim part 10a of the cover 200a permit easy attachment to the console 5a. Thus, the trim part 10a can be attached to and removed from the media device 100a easily and repetitively without damage. Alternatively, the trim part 10a can be permanently coupled to the media device 100a.

The use of the covers 200 or 200a permits dealers to stock a single type of media device, while providing customers with a cover choice from different color covers.

Although preferred embodiments have been described herein with reference to the accompanying drawings, it is to be understood that the present invention is not limited to these precise embodiments but various changes and modifications can be made by one skilled in the art without departing from the spirit and scope of the present invention. All such changes and modifications are intended to be included within the scope of the invention as defined by the appended claims.

What is claimed is:

1. A cover for a vehicle media device, the vehicle media device comprising a console disposed on a ceiling of a vehicle and a display attached to the console, the cover comprising:

a first part for receiving the console, wherein a majority of the top and bottom surfaces of the first part comprises a through hole; and a second part coupled to the first part and covering a side of the display, wherein the through hole receives a majority of top surface of the console wherein the first part is coupled to the console using a snap-on mechanism having at least one recess receiving a protrusion therein.

2. The cover as recited in claim 1, wherein the first part is coupled to the console using an adhesive.

3. The cover as recited in claim 1, wherein the second part is coupled to the first part using a hinge.

4. The cover as recited in claim 1, wherein the second part is coupled to the display.

5. The cover as recited in claim 4, wherein the second part is coupled to the display using a snap-on mechanism.

6. The cover as recited in claim 4, wherein the second part is coupled to the display using an adhesive.

7. The cover as recited in claim 6, wherein the adhesive includes two-sided tape, glue or rubber cement.

8. The cover as recited in claim 1, wherein the display pivots with respect to the console and the second part pivots with the display.

9. The cover as recited in claim 1, wherein the first part includes a second opening for receiving a data source.

10. The cover as recited in claim 9, wherein the data source comprises at least one of a compact disc, a digital video disk, a video cassette, a hard drive, a flash memory device, a memory card or a mass storage device.

11. The cover as recited in claim 1, wherein the first part includes a second opening aligned with an opening in the console.

12. The cover as recited in claim 1, wherein the first part includes a second opening aligned with a port or jack in the console.

13. A removable cover for a vehicle media device, the media device comprising a console disposed on a ceiling of a vehicle, and a display pivotally attached to the console, the removable cover comprising:

a first part substantially enclosing the console therein; and a second part substantially covering at least a side of the display, wherein a majority of top and bottom surfaces of the first part comprises a through hole, wherein the through hole receives a majority of top surface of the console wherein the first part is coupled to the console using a snap-on mechanism having at least one recess receiving a protrusion therein.

14. The removable cover as recited in claim 13, wherein the first part is coupled to the console using an adhesive.

15. The removable cover as recited in claim 13, wherein the second part is coupled to the first part using a hinge.

16. The removable cover as recited in claim 13, wherein the second part is coupled to the display.

17. The removable cover as recited in claim 16, wherein the second part is coupled to the display using a snap-on mechanism.

18. The removable cover as recited in claim 16, wherein the second part is coupled to the display using an adhesive.

19. The removable cover as recited in claim 13, wherein the display pivots with respect to the console and the second part pivots with the display.

20. The removable cover as recited in claim 13, wherein the first part includes an opening for receiving a data source.

21. The removable cover as recited in claim 13, wherein the first part includes an opening aligned with an opening in the console.

22. The removable cover as recited in claim 13, wherein the first part includes an opening aligned with a port or jack in the console.

23. A cover for a media device mounted on a ceiling of a vehicle, comprising:

a trim part for substantially enclosing an exposed perimeter of the media device; and a surface part for substantially covering a remaining exposed surface of the media device, wherein a majority of top and bottom surfaces of the trim part comprises a through hole, wherein the through hole receives the remaining exposed surface of the media device wherein the trim part is coupled to the media device using a snap-on mechanism having at least one recess receiving a protrusion therein.

24. The cover as recited in claim 23, wherein the surface part is pivotally attached to the trim part for rotating in tandem with a portion of the media device.

25. The cover as recited in claim 24, wherein the surface part attaches to a rotating portion of the media device to rotate in tandem with the rotating portion.

26. The cover as recited in claim 23, wherein the trim part includes an opening aligned with an opening in the media device.

27. The cover as recited in claim 23, wherein the trim part is coupled to the media device using an adhesive.

28. The cover as recited in claim 23, wherein the surface part is coupled to the trim part using a hinge.

29. The cover as recited in claim 23, wherein the surface part is coupled to the remaining exposed surface of the media device using a snap-on mechanism.

30. The cover as recited in claim 23, wherein the surface part is coupled to the remaining exposed surface of the media device using an adhesive.

* * * * *